(12) United States Patent
Woodward et al.

(10) Patent No.: US 9,870,466 B2
(45) Date of Patent: Jan. 16, 2018

(54) HARDWARE-ENFORCED CODE PATHS

(71) Applicant: McAfee, Inc., Santa Clara, CA (US)

(72) Inventors: Carl D. Woodward, Santa Clara, CA (US); Jennifer Eligius Mankin, San Jose, CA (US); Jeremy Bennett, San Carlos, CA (US)

(73) Assignee: McAfee, Inc., Santa Clara, CA (US)

( * ) Notice: Subject to any disclaimer, the term of this patent is extended or adjusted under 35 U.S.C. 154(b) by 5 days.

(21) Appl. No.: 14/866,928

(22) Filed: Sep. 26, 2015

(65) Prior Publication Data
US 2017/0091444 A1    Mar. 30, 2017

(51) Int. Cl.
G06F 21/52    (2013.01)
H04L 29/06    (2006.01)
G06F 21/71    (2013.01)

(52) U.S. Cl.
CPC .............. G06F 21/52 (2013.01); G06F 21/71 (2013.01); H04L 63/20 (2013.01)

(58) Field of Classification Search
CPC ..... H04L 63/20; H04L 63/0227; G06F 21/52; G06F 21/71
See application file for complete search history.

(56) References Cited

U.S. PATENT DOCUMENTS

| | | | |
|---|---|---|---|
| 5,220,669 A * | 6/1993 | Baum | G06F 9/30054 712/233 |
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,822,979 B2 | 10/2010 | Mittal | |
| 8,406,412 B2 | 3/2013 | Bethea et al. | |
| 8,490,184 B2 | 7/2013 | Brinker et al. | |
| 9,122,890 B2 * | 9/2015 | Grocutt | G06F 21/52 |
| 2008/0250216 A1 | 10/2008 | Kershaw et al. | |
| 2013/0036464 A1 | 2/2013 | Glew et al. | |

FOREIGN PATENT DOCUMENTS

WO    2017052984    3/2017

OTHER PUBLICATIONS

International Search Report and Written Opinion in PCT Application No. PCT/US2016/048806 dated Nov. 29, 2016; 11 pages.

* cited by examiner

*Primary Examiner* — Dao Ho
(74) *Attorney, Agent, or Firm* — Patent Capital Group

(57) ABSTRACT

There is disclosed in one example, a computing apparatus, including: first one or more logic elements providing a code module, the code module comprising a member having a branching policy designating either a public or private member; second one or more logic elements providing a policy engine, operable to: receive a first branch instruction to the member; determine that the branch instructions does not meet the policy; and take a security action. There is also disclosed a method of providing a policy engine, and a computer-readable medium having stored thereon executable instructions for providing a policy engine.

18 Claims, 9 Drawing Sheets

HARDWARE-ENFORCED CODE PATHS

FIELD OF THE SPECIFICATION

This disclosure relates in general to the field of computer security, and more particularly, though not exclusively to, a system and method for providing hardware-enforced code paths.

BACKGROUND

In the early days of computing, a program was simply a monolithic series of instructions that executed, one after the other, often in a linear sequence, with perhaps some internal branching.

However, in modern computing, such simple code paths are the exception rather than the rule. Modern programs have plugins, application programming interfaces (APIs), static libraries, dynamic link libraries (DLLs), shared object libraries, and a host of other types of code that may be reused or shared between different programs. These create more complex code paths.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
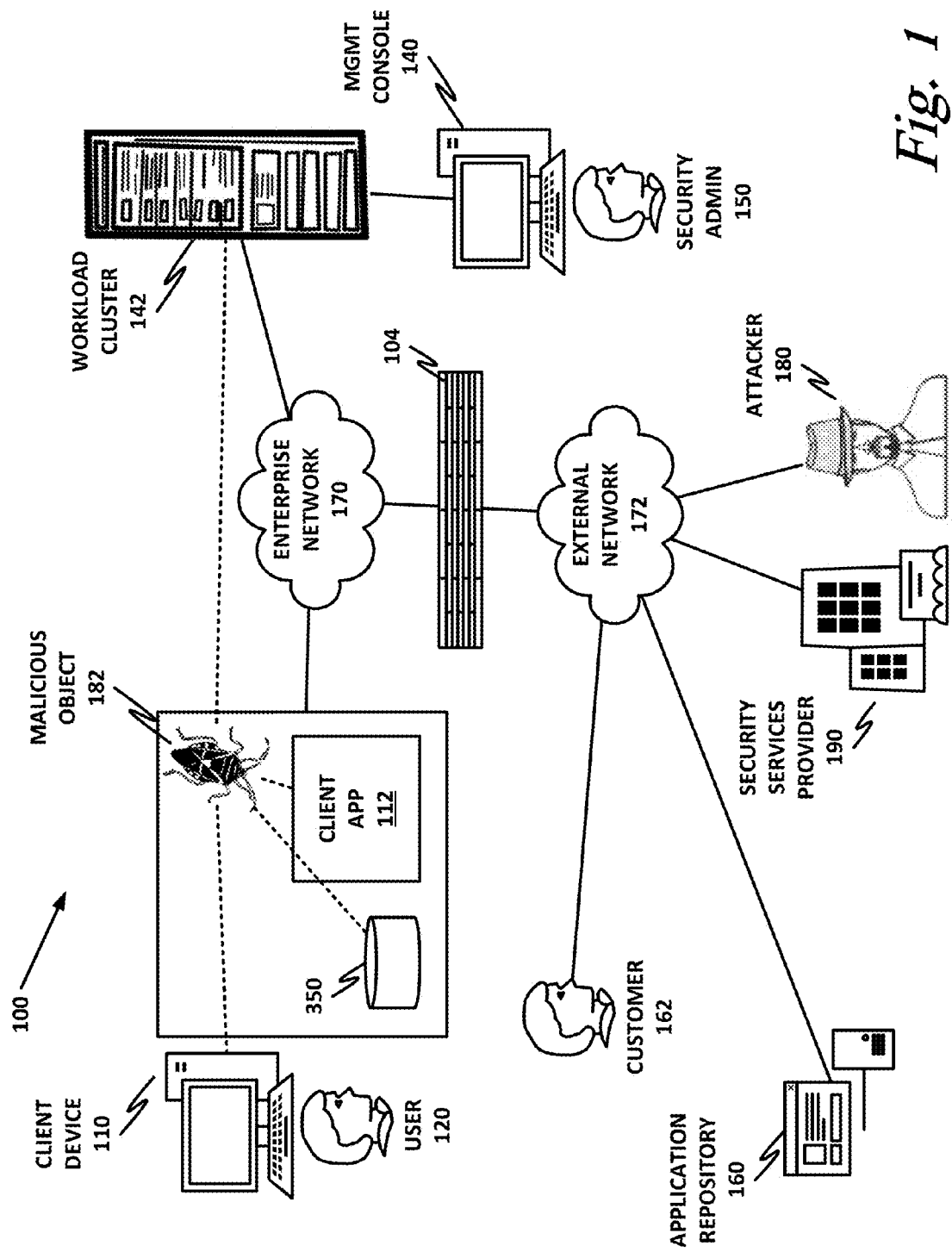
FIG. 1 is a block diagram of a security-enabled network according to one or more examples of the present specification.

There is disclosed in one example, a computing apparatus, including: first one or more logic elements providing a code module, the code module comprising a member having a branching policy designating either a public or private member; second one or more logic elements providing a policy engine, operable to: receive a first branch instruction to the member; determine that the branch instructions does not meet the policy; and take a security action. There is also disclosed a method of providing a policy engine, and a computer-readable medium having stored thereon executable instructions for providing a policy engine.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Because of the proliferation of shared code, in modern computing, it makes sense to speak of a "code path," meaning that we are interested not only in what code from which memory page is executing, but how the program counter got there. Code paths may have particular application in computer security.

One barrier that malware authors face is that their malware may not be able to operate with sufficient privileges to do the intended harmful work. For example, in some microprocessor architectures, a concept of privilege rings may be defined. Privilege rings should be understood to be a conceptual way of speaking about memory protection and security, and not necessarily a physical division or separate locations in memory. Ring 0 is the most privileged ring. Processes that are assigned to ring 0 have unlimited or nearly unlimited access to system resources. Ring 0 processes may be able to directly manipulate hardware and software and write directly to or read directly from memory, storage, or devices. Rings 1 and 2 may be reserved for drivers, and may have more direct access to resources, but not as much as ring 0. Finally, ring 3 is the "user space." Ring 3 processes may have little or no direct access to system resources, but may be able to gain controlled access via "gates" provided by lower-level rings. These gates may be in the form of an application programming interface (API), which provide defined ways in which higher-level programs are permitted to interact with system resources. The gates may provide "public methods" or "entry points," which are intended to be called directly by unprivileged processes, and which provide limited, carefully-controlled access to underlying resources. "Internal code" or "private methods" may be internal routines that provide more direct access to resources, and that have fewer limitations or restrictions on access. For example, a ring 3 process may call a routine named "FlushToDisk( )," which accepts as an argument a file handle, and whose only function is to flush a buffer currently in memory to a hard disk file identified by the file handle. Internally, FlushToDisk( ) may call a routine named "WriteDiskSector( )," which provides a very fine-grained control over writing data to a specific hard disk sector. As an outward-facing public entry point, FlushToDisk( ) may be intended to be called directly by unprivileged processes, while WriteDiskSector( )—a private internal routine—is intended to be called only from within an API, class, or other module.

One technique that malware authors use is a "privilege escalation exploit," in which malware code—which runs in an unprivileged space with little direct access to resources— attempts to "piggy back" onto a privileged process and gain the privileges of that process.

One technique of either gaining privilege escalation, or of exploiting a successful privilege escalation, or of otherwise performing a malware action, is to reverse engineer the internal entry point of a highly-privileged private routine (such as the example "WriteDiskSector( )," push appropriate argument on the program stack, and then branch to the memory location of the private method. The private method then pops the arguments off of the stack and executes as designed, potentially resulting in malicious work being successfully performed.

By way of analogy, internal or private routines may be similar to (or may include) "private" methods provided in some programming languages, such as C++ and Java, wherein the private methods are intended for use by an object, but are not intended to be accessible to code instantiating the object. Rather, public entry points may provide controlled access to the lower-level private routines.

As used throughout this specification, a "routine" is intended to include any method, procedure, object, subroutine, function, program, subprogram, object, thread, call, macro, variable, member, or other callable object containing encapsulated code, whether in source or object form. A "module" is intended to include any library, shared library, DLL, program, class, package, object, or similar entity that provides one or more public methods or entry points, which in turn may call internal code or private methods. An "entry point" is synonymous with a "public method," and is intended to encompass any routine that has an outward-facing interface that is intended to be called by a procedure external to a module providing the entry point. "Internal code" is synonymous with a "private method," and is intended to encompass any routine that is provided within a module, and is intended to be called only by public methods of the module, or of a different trusted module. In some cases, private methods and public methods may be provided within a programming language, such as C++ or Java, that includes a concept of private members and public members, but this specification is not intended to be limited to such languages.

A malware author may seek to exploit a private method by reverse engineering its entry points and its intended stack. If successful, then the malware author can cause a malware routine to place the appropriate parameters on the stack and then branch to the location of the private method. This can be a problem, because the private method may include more powerful and direct capabilities for manipulating resources than are available through its public entry points.

For example, protection mechanisms like digital rights management (DRM) may provide access control in externally callable APIs, and then call privileged internal APIs if the caller was authorized. One way to beat this protection is to reverse engineer the binary and call the internal API, directly bypassing the protection mechanisms. Using DRM as an example, an attacker would find an internal/private API that will play a video and call back instead of the external public API, which performs the DRM check.

The present specification provides a system and method for defeating attempts by a malware author to reverse engineer an entry point to a private method by providing authorized code paths that may be enforced at or near the hardware level. In an example, a computing device is provided with a processor having special instruction sets, or a hypervisor provides special instructions, in which intended code paths are enforce at or near the hardware level. In this example, when a routine attempts to execute a branch instruction, a policy engine, which in an example may be provided in processor hardware, or at a low level in the hypervisor, determines whether the branch instruction is from a memory page authorized to branch into the target routine, such as an entry point within the same or an authorized module. If the branch is from an authorized location, the branch executes normally. If it is not, then the processor may decline to perform the branch instruction, and may throw an exception, or otherwise take a security action. Thus, when a malware object attempts to branch into the private method, the policy engine may recognize the attempt, and may crash the malware object.

In an embodiment, for increased security, private methods and entry points are provided within a secure structure. The secure structure may be a memory page that includes the entry point code and the private functions, as well as other objects. The entry point code and the private methods may be cryptographically signed, for example from within a trusted execution environment (TEE), or by some other appropriate security mechanism such as symmetric or asymmetric key signing. The secure structure may have a signature attached to it en masse, or each entry point and private function of the secure structure may have an individual signature. When a call is made to a private method, the policy engine may check whether the call is from an authorized, signed entry point. Without the proper signature, a malicious malware object may not be able to spoof or otherwise represent itself as an entry point. In this case, before performing the branch instruction, the policy engine checks the signature of the source for the branch, and determines whether a private key of the entry point matches against a public key of the held by the policy engine. If there is a match, then the branch instruction is permitted to execute. If there is not a match, then the branch instruction is not permitted to execute.

In another example, the processor may be configured to provide "fixups" for relocation of a program. Relocation may comprise two operations:

a. Each object file has sections like code, data, and text. To combine all the objects to a single executable, the linker merges all sections of similar type into a single section of that type. The linker then assigns run time addresses to each section and each symbol. At this point, the code and data each have unique run time addresses.

b. Each section refers to one or more symbols that may need to be modified to point to the correct run-time addresses based on information stored in a relocation table in the object file.

The relocation table is a list of pointers created by the compiler or assembler and stored in the object or executable file. Each entry in the table, or "fixup", is a pointer to an address in the object code that is changed when the loader relocates the program. Thus, fixups may support relocation of the program as a complete, atomic unit. In some cases, each fixup in the table is itself relative to a base address of zero, so the fixups themselves are changed as the loader moves through the table.

Fixups may represent a permitted modification of signed code, or signed portions of a code page, that may be modified without altering the signature (in other words, the signing process accounts for the presence of fixups, and provides an unsigned space for fixups). However, fixups themselves may be a security aperture, as malicious code could write malicious fixups to change pointers. Thus, in an example, the policy engine ensures that fixups can only be written by an appropriate entity, such as the processor or hypervisor.

In examples, of this specification, an interface may be provided for programmers to "tag" or otherwise designate a routine as internal code routine or a private method. This may dictate which code can call the routine, including any of type execution branch (structured calls, jumps, or branches for example). Other routines may be tagged as entry code or public methods. These may be callable outside of a module.

In some examples, a simple pragma or macro may be provided by which programmers can mark particular routines as public or private, or a compiler may implicitly designate code as private when it determines that it is called by entry point routines.

Advantageously, if the policy engine is provided in hardware (such as in a processor or hypervisor), security can be provided without the need for a special API or TEE, though these may be provided to sign and manage code. Little or no change may be required in an operating system as well.

In an example implementation, regions of an executable are marked in such a way that the identity/role of the bytes in a page (or a portion of the page) can be determined by a policy engine provided by a hypervisor, processor, or other hardware or near-hardware device such as a memory controller. Each region includes a policy to be enforced by the policy engine. The policy encodes which procedures, inside or outside of the module, can execute, read or write this region, and, which other procedures can be executed, read or written to from this region Regions may also marked such that the integrity of the data can be verified once loaded into memory. Note, regions can only be modified by a trusted component (to process relocations and so forth) and integrity metadata updated such that later tampering can be identified.

When execution branches, the policy engine verifies that the change in execution is allowed by the policy of the "to" and "from" pages in question and raise an exception if the operation violates policy.

Advantageously, this method may be implemented, in traditional code with no hardware protection mechanisms can be subverted by modification or calling undocumented parts of the binary directly.

Also advantageously, programs need not be rewritten, as they may have to be to function within a TEE. Rather, routines can simply be appropriately marked and recompiled.

Also advantageously, programs may be backward compatible with environments that do not provide a supported policy engine. In that case, the security pragmas marking routines as public or private may simply be ignored.

The methods disclosed herein may also be used to isolate code and data that should be separate.

In an example, individual objects are given a policy, such as via a pragma, markup, or otherwise. "Public" and "private" policies are provided by way of nonlimiting example, but many other policies are possible. In some cases, fine-grained control may be maintained by providing very specific policies. Objects may also be given identities.

During compilation and linking, objects that are assigned the same identity are placed into code sections that occupy the same physical pages (e.g., in "modules").

Individual modules may be marked with a header or "magic number."

A cryptographic signature and metadata may be used to prepare the code for execution, and placed at the end of the page or code region. The signature may be used to verify that the data has not been tampered with. The metadata may contain all of the information required to make the page/region ready for execution (like relocation data).

The specific key used to sign the code may be derived from the owner of the policy engine, but other schemes are possible. The policy engine may verify that the page or region has not been tampered with and that only the builder of the software can build variants of the executable. In some cases, this may comprise signing objects from within a TEE, though this is not required.

All of the information required to verify a page/region may be provided internally before page modifications (like fixups) occur. No external data (like relocation tables or signature sections) may be required. Rather, the policy engine may not have to reference other pages in order to validate the code or make it ready for execution.

The life cycle of a secure structure (e.g., a protected page), may be as follows:

a. Page Store/Load—Occurs when a page is first fully written to:
   i. Check for the presence of a known "magic header," identifying the structure as a secure structure. If a magic header is not found, the page has no identity or policy and may be treated as a default non-privileged page.
   ii. If a magic header is found, the policy engine may hash the page and compare against a key to verify that the page has not been modified since compilation and linking. If the page verifies, the policy engine may create metadata for the page in its own internal store.
   iii. If the secure structure has been tampered with, policy engine may raise an exception or otherwise fail.
b. Page fixup occurs when a page has been successfully identified as a special protected page.
   i. A trusted page loader provided by the policy engine walks the signature metadata, and performs any operations required to make the page ready for execution. Note that in an embodiment, only the policy engine is able to modify the page. If any other code attempts to modify the page, an exception or fault may be raised by policy engine.
   ii. Once the page is ready for execution, it is remeasured, and the measurement is stored in the policy enforcement meta data for the page.
c. Page Touch/Branch
   i. At every branch instruction, the policy engine may validate the "to" and "from" branch addresses and ensure that they comply with page policy (e.g., the "from page" is allowed to branch to the "to page" and vice versa). If the branch violates policy, the policy engine may raise an exception or fault. A similar policy could be implemented for reading and writing to pages (the policy engine verifies that the code "from page" has read/write/execute access to the "to page").
   ii. This method could be optimized to only perform branch checking in processes and other contexts where it is known protected pages are in use.
d. Page Release, when a secure structure is paged out.
   i. To prevent changes to the operating system, the policy engine watches operating system paging tables for changes. If a page table entry for a protected page is marked as being invalid, the protected page is said to be released. If a page table entry for a protected page is marked as being paged out (not in transition), the protected page is said to be evicted.
ii. If the page is released, the policy engine may securely wipe the physical page and then release its metadata. This helps to ensure that the page is not abused.

If the page is evicted, the policy engine may associate the page table entry contents with the pages meta data (which includes the measurements from when the page was made ready to execute). When the page is brought back in (determined by watching the page table entry changing from "paged out" to "paged in") the policy engine may validate that the page was correctly faulted back in against the measurement stored in the metadata/database used by the policy engine.

The policy engine of the present specification may also have less overhead than some existing solutions, such as TEEs and secure APIs.

A system and method for providing hardware-enforced code paths will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. In the example of FIG. 1, secured enterprise 100 may be configured to provide services or data to one or more customers 162, who may access information or services via external network 172. This may require secured enterprise 100 to at least partly expose certain services and networks to the outside world, thus creating a logical security aperture.

Within secured enterprise 100, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

Figure 2:
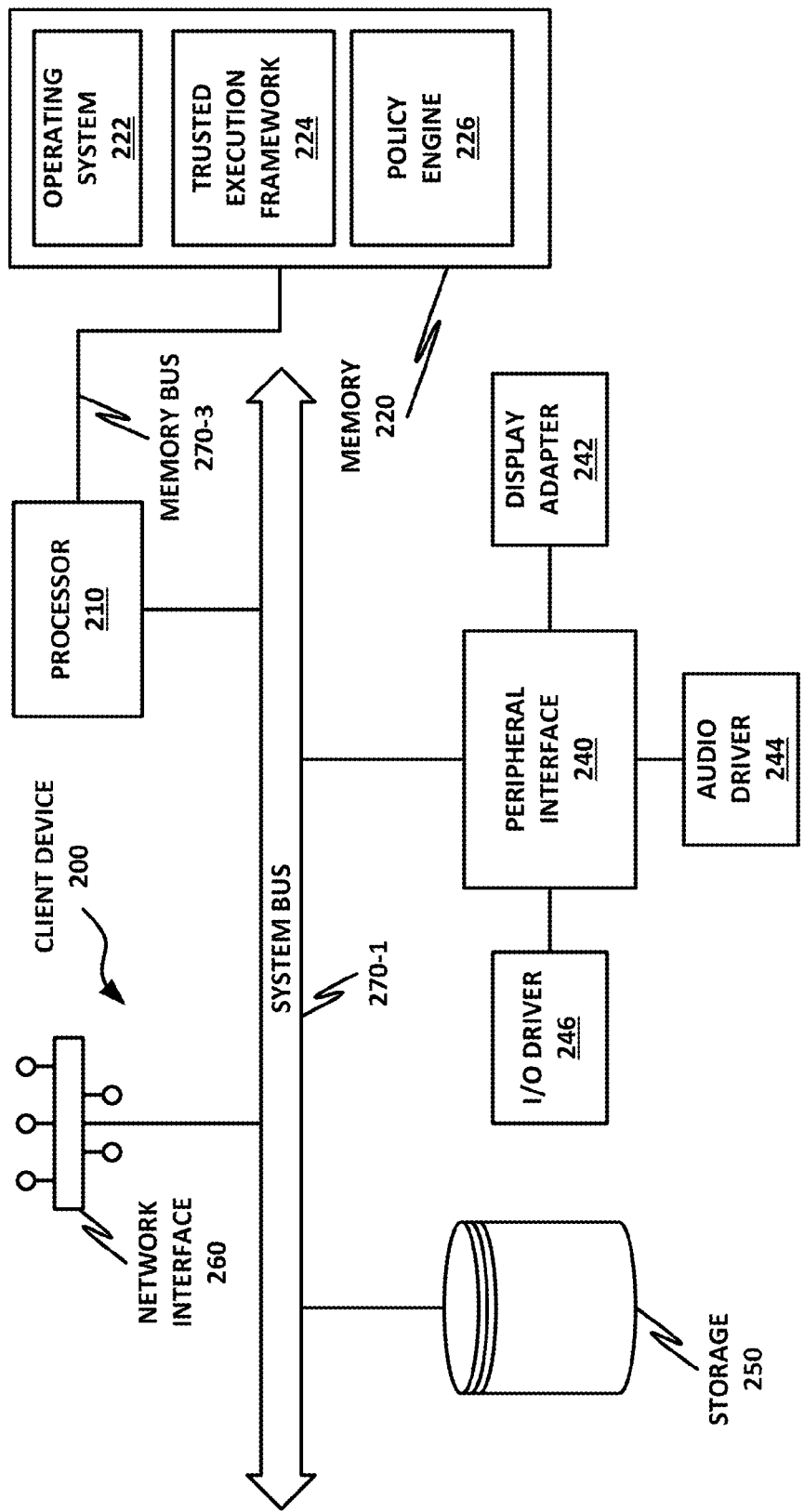
FIG. 2 is a block diagram of a computing device according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a trusted execution framework 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of trusted execution framework 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Trusted execution framework (TEF) 224, in one example, is operable to carry out computer-implemented methods as described in this specification. TEF 224 may include one or more tangible non-transitory computer-readable mediums having stored thereon executable instructions operable to instruct a processor to provide a trusted execution framework 224. As used throughout this specification, an "engine" includes any combination of one or more logic elements, of similar or dissimilar species, operable for and configured to perform one or more methods provided by the engine. Thus, TEF 224 may comprise one or more logic elements configured to provide methods as disclosed in this specification. In some cases, TEF 224 may include a special integrated circuit designed to carry out a method or a part thereof, and may also include software instructions operable to instruct a processor to perform the method. In some cases, TEF 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space" associated with ring 0, 1, or 2 in a protection ring architecture. It should also be noted that TEF 224 may also include other hardware and software, including configuration files, registry entries, and interactive or user-mode software by way of non-limiting example.

In one example, TEF 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of TEF 224 to provide the desired method.

Figure 3:
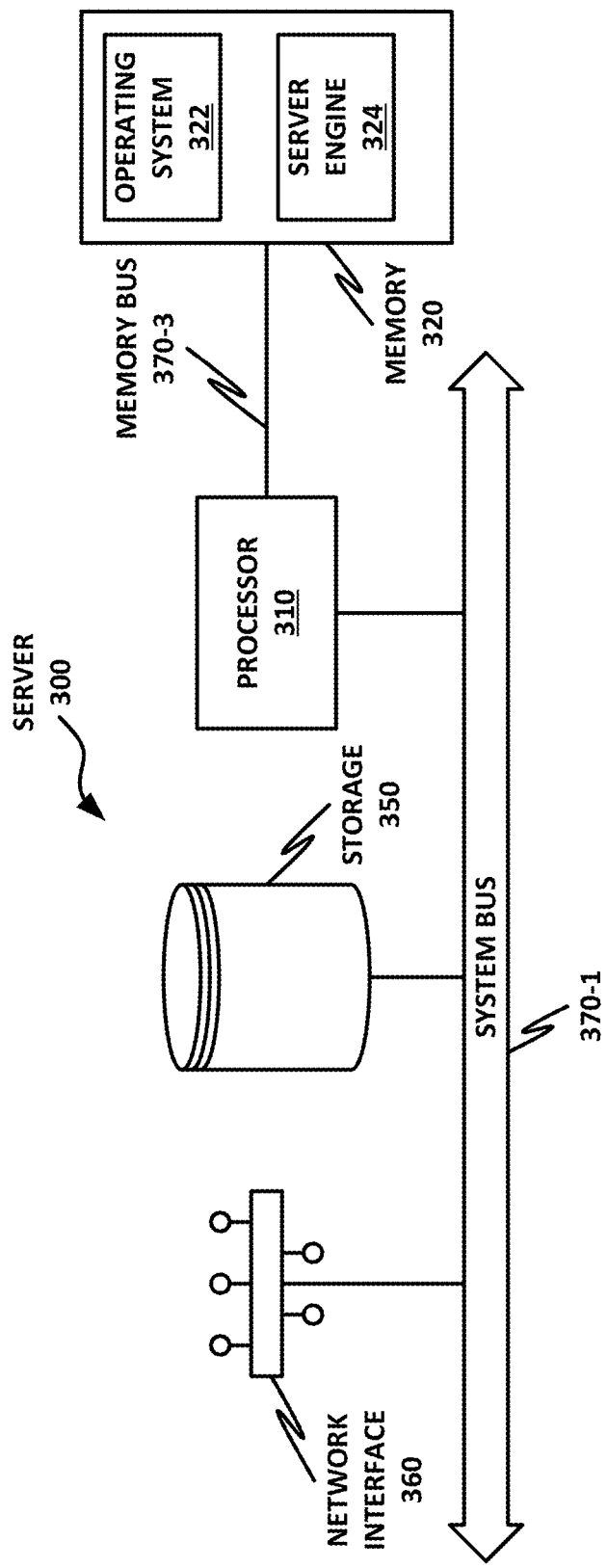
FIG. 3 is a block diagram of a server according to one or more examples of the present specification.

Conceptually, TEF 224 may provide an application programming interface (API), and supporting software, that simplifies a programmer's use of TEE 300 (FIG. 3).

Server engine 324 is an engine as described in FIG. 2 and, in one example, includes one or more logic elements operable to carry out computer-implemented methods as described in this specification. Software portions of server engine 324 may run as a daemon process.

Policy engine 226 may include one or more non-transitory computer-readable mediums having stored thereon executable instructions operable to instruct a processor to provide policy engine 226. At an appropriate time, such as upon booting client device 200 or upon a command from operating system 222 or a user 120 or security administrator 150, processor 210 may retrieve a copy of policy engine 226 (or software portions thereof) from storage 250 and load it into memory 220. Processor 210 may then iteratively execute the instructions of policy engine 226 to provide the desired method.

Figure 8:
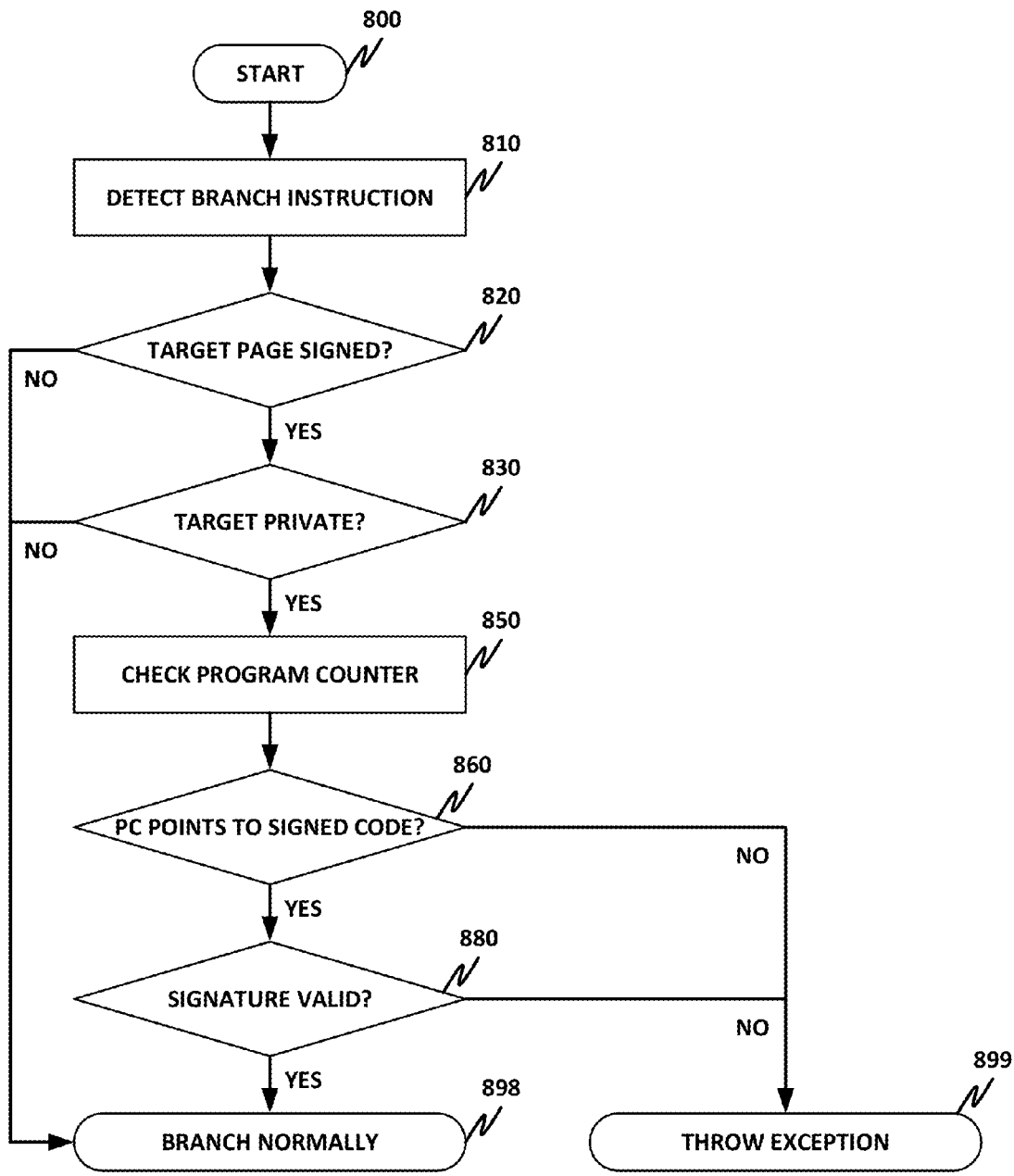
FIG. 8 is a flow chart of a predictive branch check according to one or more examples of the present specification.
Figure 9:
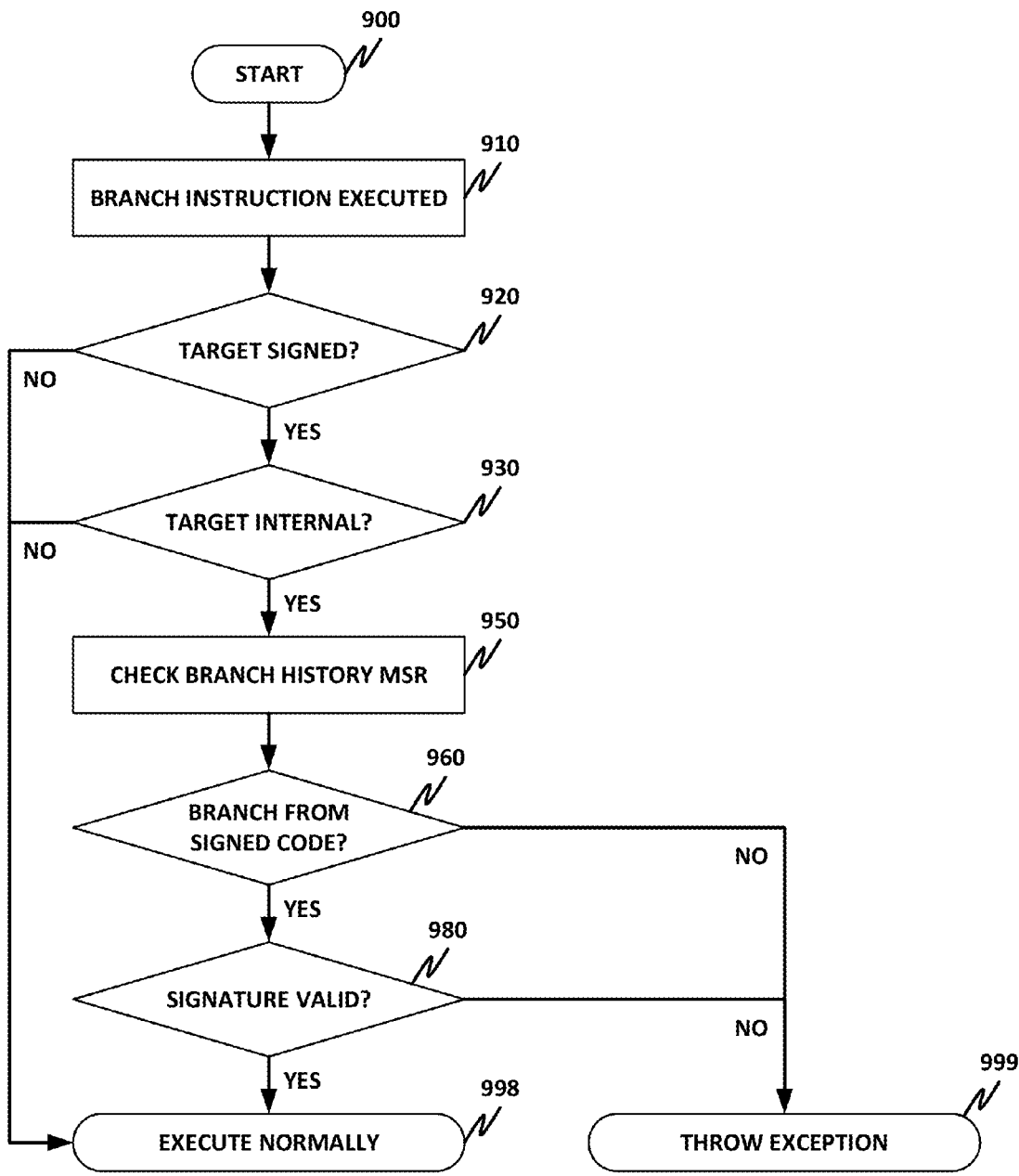
FIG. 9 is a flow chart of a reactive branch check according to one or more examples of the present specification

Policy engine 226 may be configured to perform the methods of this specification, such as method 800 of FIG. 8 or method 900 of FIG. 9, or other suitable methods. In some embodiments, policy engine 226 may be provided within the hardware of processor 220, within a hypervisor, or within a memory controller. Policy engine 226 may also be provided in any other suitable configuration, including hardware and near-hardware implementations. In some cases, the methods of policy engine 226 may be embodied in a computer-readable medium with executable instructions stored thereon. In an example, that computer-readable medium may comprise hardware instructions or microcode written directly into processor 220, or in a ROM or flash chip.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 300 to a wired or wireless network, and may include one or more logic elements as described in FIG. 2.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide server engine 324. At an appropriate time, such as upon booting server 300 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Server engine 324 may be an enterprise-class security server, which may be configured to provide supplemental security services such as reputations, antivirus, antimalware, anti-phishing, anti-adware, or any other suitable security service. These may be provided to supplement the security provided by policy engine 226.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

Figure 4:
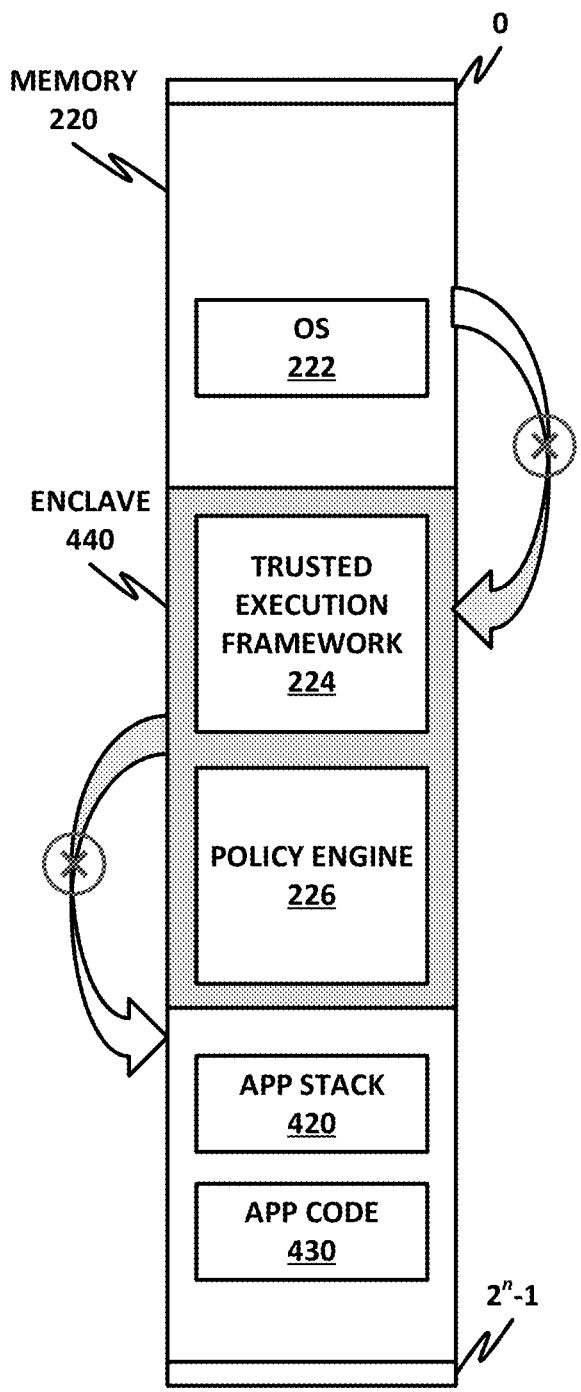
FIG. 4 is a block diagram of a trusted execution environment according to one or more examples of the present specification.

FIG. 4 is a block diagram of a trusted execution environment (TEE) 300 according to one or more examples of the present specification.

In the example of FIG. 4, memory 220 is addressable by n-bits, ranging in address from 0 to $2^n-1$. Within memory 220 is an OS 222, enclave 440, application stack 420, and application code 430.

In this example, enclave 440 is a specially-designated portion of memory 220 that cannot be entered into or exited from except via special instructions, such as Intel® SGX or similar. Enclave 440 is provided as an example of a secure environment which, in conjunction with a secure processing engine 410, forms a trusted execution environment (TEE) 400. A TEE 400 is a combination of hardware, software, and/or memory allocation that provides the ability to securely execute instructions without interference from outside processes, in a verifiable way. By way of example, TEE 400 may include memory enclave 440 or some other protected memory area, and a TEF 224, which includes hardware, software, and instructions for accessing and operating on enclave 440. Non-limiting examples of solutions that either are or that can provide a TEE include Intel® SGX, ARM TrustZone, AMD Platform Security Processor, Kinibi, SecuriTEE, OP-TEE, TLK, T6, Open TEE, and SierraTEE, CSE, VT-x, MemCore, Canary Island, Docker, and Smack. Thus, it should be noted that in an example, secure processing engine 410 may be a user-mode application that operates via trusted execution framework 224 within enclave 440. TEE 400 may also conceptually include processor instructions that secure processing engine 410 and trusted execution framework 224 require to operate within enclave 440.

Secure processing engine 410 and trusted execution framework 224 may together form a trusted computing base (TCB), which is a set of programs or computational units that are trusted to be secure. Conceptually, it may be advantageous to keep TCB relatively small so that there are fewer attack vectors for malware objects 182 or for negligent software. Thus, for example, operating system 222 may be excluded from TCB, in addition to the regular application stack 420 and application code 430.

In certain systems, computing devices equipped with the Intel Software Guard Extension (SGX) or equivalent instructions may be capable of providing an enclave 440. It should be noted however, that many other examples of TEEs are available, and TEE 400 is provided only as one example thereof. Other secure environments may include, by way of nonlimiting example, a virtual machine, sandbox, testbed, test machine, or other similar device or method for providing a TEE 400.

In an example, enclave 440 provides a protected memory area that cannot be accessed or manipulated by ordinary computer instructions. Enclave 440 is described with particular reference to an Intel® SGX enclave by way of example, but it is intended that enclave 440 encompass any secure processing area with suitable properties, regardless of whether it is called an "enclave."

One feature of an enclave is that once an enclave region 440 of memory 220 is defined, as illustrated, a program pointer cannot enter or exit enclave 440 without the use of special enclave instructions or directives, such as those provided by Intel® SGX architecture. For example, SGX processors provide the ENCLU[EENTER], ENCLU[ERESUME], and ENCLU[EEXIT]. These are the only instructions that may legitimately enter into or exit from enclave 440.

Thus, once enclave 440 is defined in memory 220, a program executing within enclave 440 may be safely verified to not operate outside of its bounds. This security feature means that secure processing engine 410 is verifiably local to enclave 440. Thus, when untrusted packet 120 provides its content to be rendered with secure processing engine 410 of enclave 440, the result of the rendering is verified as secure.

Enclave 440 may also digitally sign its output, which provides a verifiable means of ensuring that content has not been tampered with or modified since being rendered by secure processing engine 410. A digital signature provided by enclave 440 is unique to enclave 440 and is unique to the hardware of the device hosting enclave 440.

Figure 5:
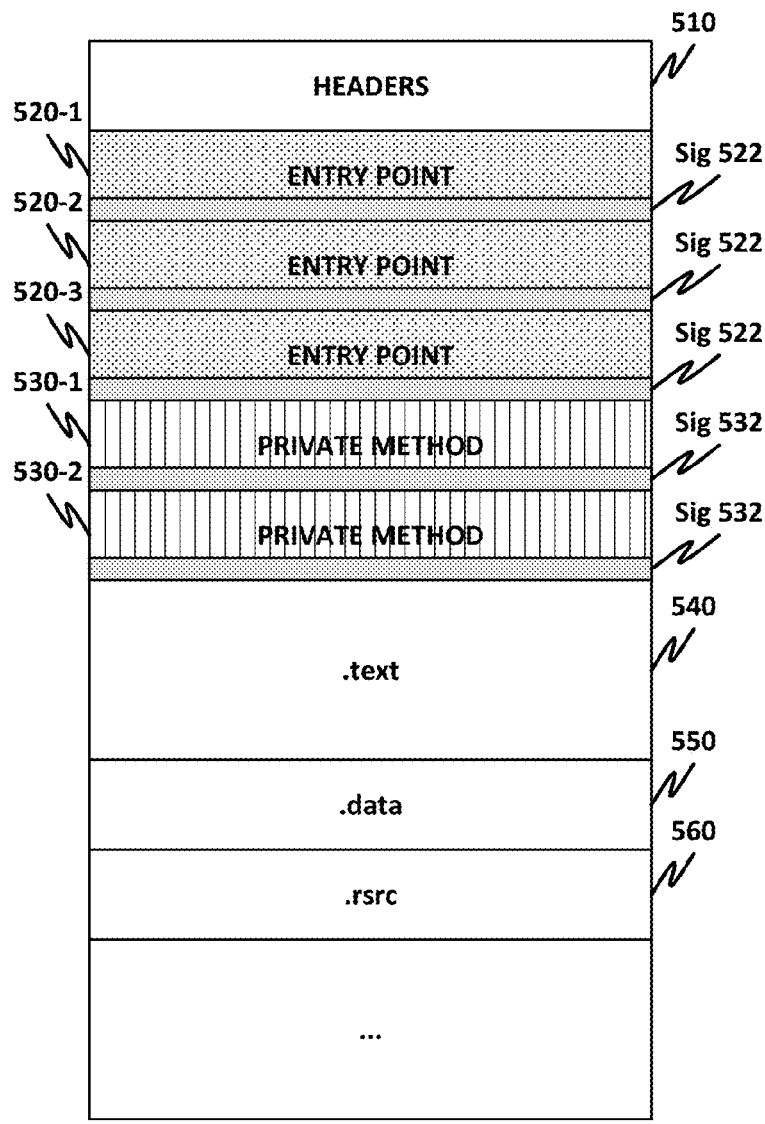
FIG. 5 is a block diagram of a secure structure according to one or more examples of the present specification
Figure 5:
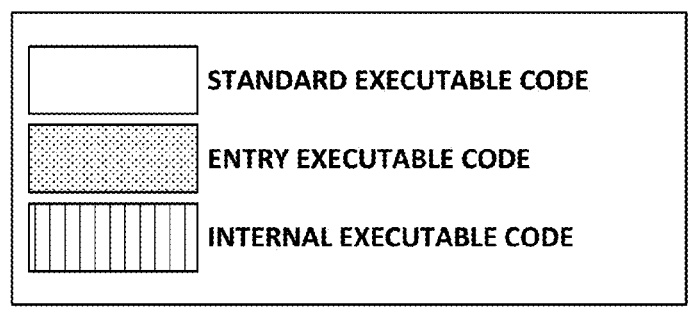

FIG. 5 is a block diagram of a secure structure 500 according to one or more examples of the present specification.

In this example, secure structure 500 includes certain standard executable code that may not be encrypted and that is not protected according to the methods of this specification. These include, in this example, headers 510, including NT and DOS headers, textual data 540, other data 550, and resource files 560. These may have all been aggregated by the compiler or linker at build time.

Secure structure 500 also include entry points 520, and private methods 530. Entry points 520 may be publicly-accessible routines that are accessible by external processes (e.g., processes that reside without secure structure 500, which may be a single module). Private methods 530 may be accessible only from within secure structure 500.

In this example, each entry point 520 and private method 530 is cryptographically signed, such as from within a TEE or otherwise. Each may also include an unsigned region for fixups if necessary. To ensure that fixups are not abused, manipulation of fixups may be limited to policy engine 226, which may be implemented in hardware.

According to the methods of the present specification, it is intended that private methods 530 are accessible only via entry points 520. Thus, any attempt for any procedure in a memory page outside of secure structure 500 to directly call private methods 530 may fail, resulting in an exception or other error condition.

Figure 6:
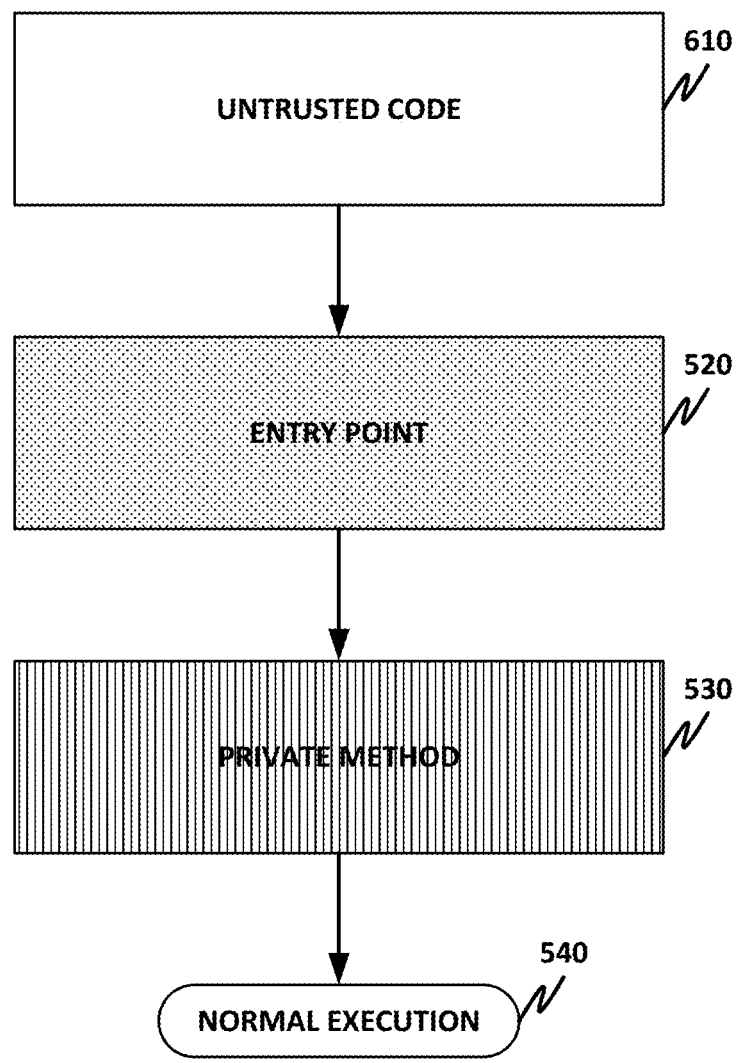
FIG. 6 is a block diagram of a permitted code path according to one or more examples of the present specification.

FIG. 6 illustrates a permissible code pass according to one or more examples of the present specification. In the example of FIG. 6, untrusted code, which is not signed and verified, such as user space code, calls entry point 520. Entry point 520 may be cryptographically signed, and may be part of secured structure 500. After untrusted code 610 calls entry point 520, entry point 520 calls private method 530. Because this is a valid code path, private method 530 executes without any error conditions in block 540.

Figure 7:
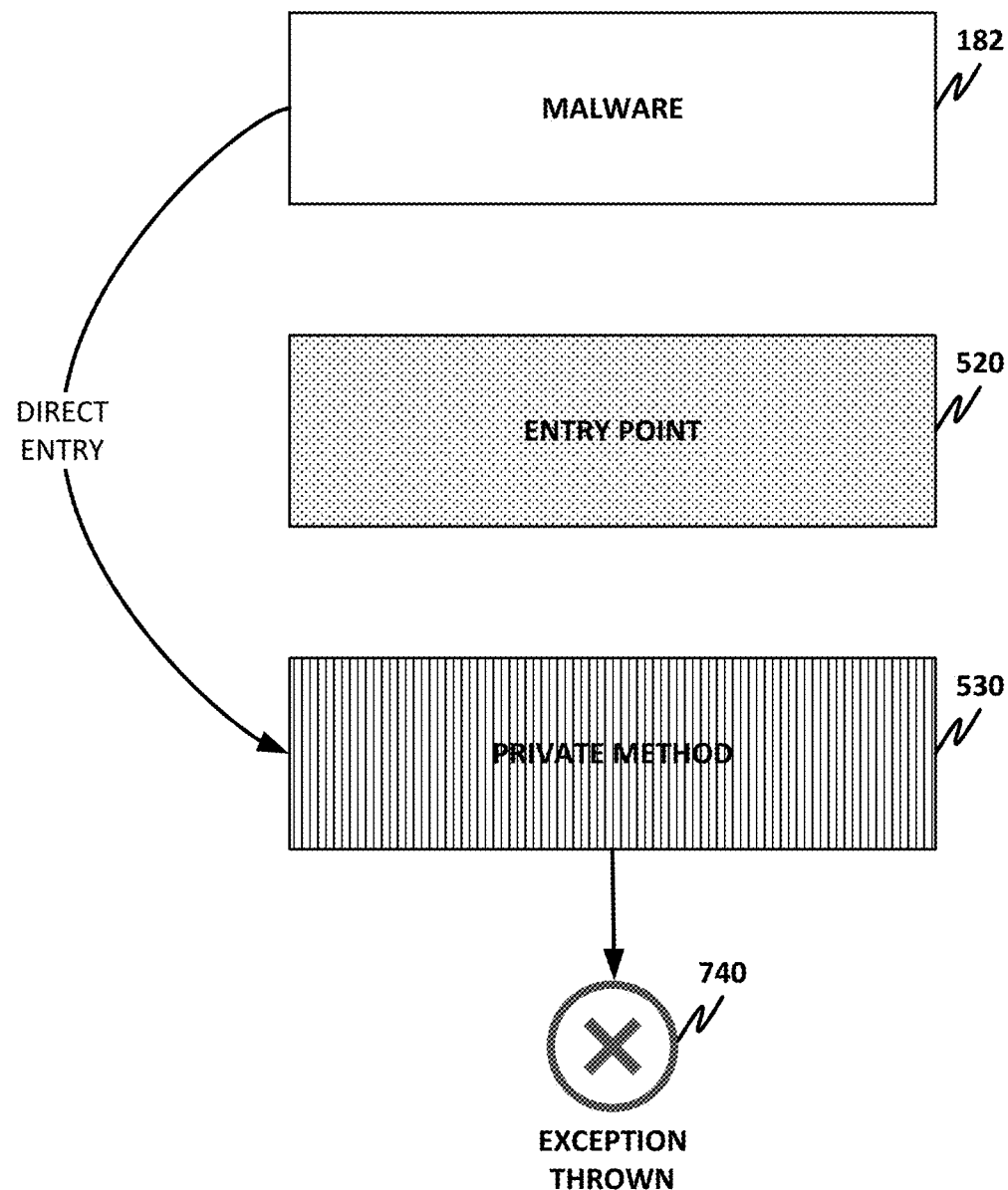
FIG. 7 is a block diagram of a blocked code path according to one or more examples of the present specification.

FIG. 7 is a block diagram illustrating an example an attempted exploit according to one or more examples of the present specification. In the example of FIG. 7, a malware object 182 attempts direct entry to private method 530, bypassing entry point 520.

According to methods disclosed in this specification, policy engine policy engine 226 may detect the attempt to bypass entry point 520, and in block 740 throws an exception.

FIG. 8 is a flowchart illustrating a method 800 of a policy engine 226 detecting an attempt to bypass entry point 520 according to one or more examples of the present specification.

Starting in block 810, policy engine 226 detects a branch instruction.

In decision block 820, policy engine 226 checks to see whether the target page is signed, for example whether it is part of a secure structure 500. It should be noted that signing a secure structure 500 is disclosed herein by way of non-limiting example only, and other methods of protecting secured structure 500 may be used.

If the target page is not signed, then in block 898, the branch instruction executes normally with no additional checks. This represents a branch instruction to a memory page that is not protected, and thus may be called by any branch instruction.

If the target page is signed, then in decision block 830, policy engine 226 determines whether the target procedure is private method or internal code.

If it is not a private method, then again, in block 898, the branch executes normally.

If it is private method, then in block 850, policy engine 226 checks an appropriate register, such as the program counter.

In decision block 860, policy engine 226 checks whether the program counter points to signed code, such as entry point 520. Note that in some examples, this comprises a two-way check of whether the entry point is authorized to branch to the private method, and whether the private method is authorized to be entered from the entry point.

If the program counter points to code that is not entry point 520, or that is not signed, or that is otherwise not authorized, then in block 899, policy engine 226 throws an exception.

If the program counter points to signed code, then in block 880, policy engine 226 checks whether the signature is valid. Again, if the signature is not valid, then in block 899, policy engine 226 throws an exception.

If the signature is valid, then the attempted entry into private method 530 is via an authorized entry point 520, and in block 898, the branch executes normally.

FIG. 9 is a flowchart of a second method of branching according to one or more examples of the present specification. This method discloses a reactive branch check, where the check is performed after the branch is complete. FIG. 8 in contrast may be a predictive branch check.

In block 910, a procedure performs a branch instruction. In this case, the branch is executed, and control passes to the private method 530. However, private method 530 will only continue executing if the branch is from a legitimate entry code 520.

In block 920, policy engine 226 checks whether the target page is signed. This is similar to the check in decision block 820 of FIG. 8.

If the target is unsigned, then in block 998, execution may proceed normally.

In block 930, if the target is signed, then policy engine 226 checks whether it is a private method 530. If it is not private, for example if it is entry point 520, then again, in block 998, the branch continues to execute normally.

If the target is a private method 530, then in block 950, policy engine 226 checks a an appropriate register, such as the model specific register (MSR) branch history, which includes the address of the previous branch or jumping-off point of a previous branch instruction.

In block 960, policy engine 226 checks whether the branch is from signed code. If not, then in block 999, policy engine 226 throws an exception or otherwise fails the execution.

If the branch is from signed code, then in block 980, policy engine 226 checks whether the signature is valid. If the signature is not valid, then again, in block 999, an exception is thrown.

If the signature is valid, then in block 998, the branch continues to execute normally.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA)

or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in one example, a computing apparatus, comprising: first one or more logic elements comprising a code module, the code module comprising a member having a branching policy; second one or more logic elements comprising a policy engine, operable to: receive a first branch instruction to the member; determine that the branch instructions does not meet the policy; and take a security action.

There is further disclosed an example, wherein the member is a private method, and wherein the policy comprises a rule that the private member may not be accessed by external routines.

There is further disclosed an example, wherein the code module further comprises a public member, and wherein the policy engine is further operable to receive a second branch instruction from an external source to the public member, and allow the branch to execute.

There is further disclosed an example, wherein the policy engine is further operable to receive a third branch instruction to the private member, determine that the third branch instruction comes from an authorized source internal to the module, and allow the branch to execute.

There is further disclosed an example, wherein the policy engine is configured to perform predictive branch checking, comprising evaluating the policy before branching.

There is further disclosed an example, wherein the policy engine is configured to perform reactive branch checking, comprising evaluating the policy after branching.

There is further disclosed an example, wherein the policy engine comprises a trusted execution environment (TEE).

There is further disclosed an example, wherein the security action comprises throwing an exception.

There is further disclosed an example, wherein the policy comprises a private method designation.

There is further disclosed an example, wherein the policy comprises a public method designation.

There is further disclosed an example, wherein the policy engine is implemented at least partly in processor hardware.

There is further disclosed an example, wherein the policy engine is implemented at least party in a hypervisor or memory controller.

There is further disclosed an example, wherein determining that the branch instruction does not meet the policy comprises determining that a calling procedure of the branch instruction does not include a call-to marker for the member.

There is further disclosed an example of one or more tangible, non-transitory computer-readable storage mediums having stored thereon executable instructions for instructing one or more processors for providing a policy engine operable for performing any or all of the operations of the preceding examples.

There is further disclosed an example of a method of providing a policy engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

There is further disclosed an example of a method of performing any or all of the operations of a policy engine.

There is further disclosed an example of an apparatus comprising a policy engine, wherein the policy engine is provided at least partly in processor hardware, a hypervisor, or a memory controller.

What is claimed is:

1. A computing apparatus, comprising:
   first one or more logic elements, including at least a hardware logic element, comprising a module providing executable code including a cryptographically signed private routine having a public entry point, the public entry point configured to be accessible by an unprivileged process, the private routine having associated therewith a branching policy comprising a requirement that entry to the private routine be from a signed entry point; and
   second one or more logic elements, including at least a hardware logic element, comprising a policy engine, operable to:
   receive a first branching instruction to the private routine;
   determine that the first branching instruction is not a signed entry point for the private routine, comprising a branch check selected from predictive branch checking, comprising evaluating the branching policy before branching, and reactive branch checking, comprising evaluating the branching policy after branching; and
   take a security action.

2. The computing apparatus of claim 1, wherein the module further comprises a public routine, and wherein the policy engine is further operable to receive a second branching instruction from an external source to the module, and allow the second branching instruction to execute.

3. The computing apparatus of claim 1, wherein the policy engine is further operable to receive a third branching instruction to the private routine, determine that the third branching instruction comes from an authorized source internal to the module, and allow the third branching instruction to execute.

4. The computing apparatus of claim 1, wherein the policy engine is implemented within a trusted execution environment (TEE).

5. The computing apparatus of claim 1, wherein the security action comprises throwing an exception.

6. The computing apparatus of claim 1, wherein the branching policy comprises a private routine designation.

7. The computing apparatus of claim 1, wherein the branching policy comprises a public routine designation.

8. The computing apparatus of claim 1, wherein the policy engine is implemented at least partly in processor hardware.

9. The computing apparatus of claim 1, wherein the policy engine is implemented at least partly in a hypervisor or memory controller.

10. The computing apparatus of claim 1, wherein determining that the first branching instruction is not a signed entry point for the private routine comprises determining that a calling procedure of the first branching instruction does not include a call-to marker for the routine.

11. One or more tangible, non-transitory computer-readable storage mediums having stored thereon executable instructions for providing a policy engine, operable to:

execute a module providing executable code, including a cryptographically signed private routine having a public entry point, the public entry point configured to be accessible by an unprivileged process, the private routine having associated therewith a branching policy comprising a requirement that entry to the private routine be from a signed entry point;

receive a first branching instruction to the private routine;

determine that the first branching instruction is not a signed entry point for the private routine, comprising a branch check selected from predictive branch checking, comprising evaluating the branching policy before branching, and reactive branch checking, comprising evaluating the branching policy after branching; and take a security action.

12. The one or more tangible, non-transitory computer-readable storage mediums of claim 11, wherein the module further comprises a public routine, and wherein the policy engine is further operable to receive a second branching instruction from an external source to the public routine, and allow the second branching instruction to execute.

13. The one or more tangible, non-transitory computer-readable storage mediums of claim 11, wherein the branching policy comprises a private routine designation.

14. The one or more tangible, non-transitory computer-readable storage mediums of claim 11, wherein the branching policy comprises a public routine designation.

15. The one or more tangible, non-transitory computer-readable storage mediums of claim 11, comprising processor hardware instructions or microcode.

16. The one or more tangible, non-transitory computer-readable storage mediums of claim 11, comprising a hypervisor or memory controller.

17. The one or more tangible, non-transitory computer-readable storage mediums of claim 11, wherein determining that the first branching instruction is not a signed entry point for the private routine comprises determining that a calling procedure of the first branching instruction does not include a call-to marker for the routine.

18. A computer-implemented method of providing a policy engine for branching instructions, comprising:

executing a module providing executable code, including a cryptographically signed private routine having a public entry point, the public entry point configured to be accessible by an unprivileged process, the private routine having associated therewith a branching policy comprising a requirement that entry to the private routine be from a signed entry point;

receiving a first branching instruction to the private routine;

determining that the first branching instruction is not a signed entry point for the private routine, comprising a branch check selected from predictive branch checking, comprising evaluating the branching policy before branching, and reactive branch checking, comprising evaluating the branching policy after branching; and taking a security action.

* * * * *